United States Patent [19]
Davina

[11] Patent Number: 5,725,346
[45] Date of Patent: Mar. 10, 1998

[54] SELF-LOADING BALE HANDLING AND TRANSPORTING APPARATUS

[75] Inventor: Glenn A. Davina, Klamath Falls, Oreg.

[73] Assignee: Sunny D Manufacturing, Inc., Klamath Falls, Oreg.

[21] Appl. No.: 587,649

[22] Filed: Jan. 17, 1996

[51] Int. Cl.⁶ ................................................ A01D 90/02
[52] U.S. Cl. ..................... 414/111; 280/491.1; 414/528; 414/543
[58] Field of Search .................... 414/24.5, 24.6, 414/111, 501, 523, 528, 537, 541, 542, 543, 549, 550, 555; 280/401, 491.1, 491.3; 294/119.1

[56] References Cited

U.S. PATENT DOCUMENTS

| | | | |
|---|---|---|---|
| 2,954,886 | 10/1960 | Nelson . | |
| 3,927,778 | 12/1975 | Zrostlik | 294/119.1 |
| 3,997,069 | 12/1976 | McCanse et al. . | |
| 4,072,242 | 2/1978 | Cook | 414/528 X |
| 4,091,943 | 5/1978 | Bay-Schmith | 414/555 X |
| 4,101,081 | 7/1978 | Ritter et al. | 414/24.5 X |
| 4,249,842 | 2/1981 | Johnson | 414/24.5 |
| 4,358,235 | 11/1982 | Butler et al. | 414/24.5 |
| 4,363,583 | 12/1982 | Bontrager | 414/24.5 |
| 4,426,183 | 1/1984 | Butler | 414/24.5 |
| 4,441,845 | 4/1984 | Gibson | 414/24.6 |
| 4,498,829 | 2/1985 | Spikes | 414/550 X |
| 4,552,501 | 11/1985 | Clark et al. | 414/555 X |
| 4,630,986 | 12/1986 | Taylor | 414/24.6 |
| 4,741,656 | 5/1988 | Bishop | 414/24.6 |
| 4,789,289 | 12/1988 | Wilson | 414/24.6 |
| 4,909,694 | 3/1990 | Peters et al. | 414/24.5 |
| 5,281,068 | 1/1994 | Bruce | 414/24.5 |
| 5,288,193 | 2/1994 | Warburton et al. | 414/24.5 |
| 5,388,949 | 2/1995 | Berg | 414/537 X |

OTHER PUBLICATIONS

Brochure on "Hay Squeeze" from Sunny D Manufacturing, Inc. Prior Art Product.

Primary Examiner—Janice L. Krizek
Attorney, Agent, or Firm—Klarquist Sparkman Campbell Leigh & Whinston

[57] ABSTRACT

A bale handling and transporting apparatus has a bale handler on a trailer or body which can be positioned to pick up bales located on either side of the body. The bale handler may have an upright boom, a boom arm, and a bale gripper. The boom is pivoted to move the boom arm and the bale gripper to either side of the body. The boom may be adjusted in length and lowered to place a bale within jaws of the bale gripper. A stabilizer supports the body during the bale lifting operation. The boom and boom arm are operated to lift the bale onto the trailer or body. A conveyor belt shifts bales along the length of the trailer in either direction. The belt is keyed to the trailer to prevent sideways shifting of the belt relative to the trailer body, such as when the trailer is on a hillside. The body may be articulated with first and second bed sections. When empty, one of the bed sections may be pivoted or otherwise positioned to overlie the other bed section to reduce the overall length of the trailer. The rear end of the rearmost bed section may be lowered and a tailgate dropped to facilitate bale unloading.

21 Claims, 5 Drawing Sheets

SELF-LOADING BALE HANDLING AND TRANSPORTING APPARATUS

FIELD OF THE INVENTION

This invention relates to a self-loading bale handling and transporting apparatus.

BACKGROUND OF THE INVENTION

Over the past few decades, the farming industry has made significant developments in the manner in which hay is gathered from the field and distributed. Initially, hay was gathered manually into stacks. As labor costs increased, the farming industry began mechanically compressing the hay into bales. At one time, the bales were of a rectangular cross section and small enough to be handled by hand. Further cost-cutting efforts introduced large round bales, for example, up to six feet in diameter, and large cubical bales. These bales often weigh 1600 pounds or more. The large round bales vary in size and weight. Currently, bales are commonly being made in the 2000–2800 pound range. Farmers are often now using shrinkwrap to retain and protect hay in these bales.

As the bale size grew, the bales could no longer be handled manually. Therefore, a need arose for an apparatus for handling and transporting the large heavy bales.

In response to the need, trailers were developed for carrying numerous bales at once. Mechanisms were also developed for picking up the bales off the ground and placing them on the trailer.

Although the trailers greatly increased the speed with which the hay bales may be picked up and transported, inadequacies still exist with the trailers known to the inventor. For instance, trailers that can accommodate numerous bales are often very large or lengthy. While the length may be advantageous in transporting bales off the field, a long trailer is difficult to transport on the highway. Also, known self-loading trailers are capable of picking up a bale along only one side of the trailer or in front of the trailer, thereby slowing bale pickup, as the trailer must be maneuvered to orient the correct side of the trailer in position for picking up the bale.

The current mechanisms for grasping bales also suffer from disadvantages. Some of the mechanisms spear or forklift the bales to lift them. This may puncture the shrinkwrap on the bales. Others use a forklift-like assembly for gripping a bale, but are limited to transporting one bale. Another disadvantage of some mechanisms is that they accommodate a bale of only one size.

Therefore, a need exists for a self-loading bale handling and transportation apparatus directed toward overcoming these and other problems of existing devices.

SUMMARY OF THE INVENTION

Accordingly, it is an object of the present invention to provide an improved bale handling and transporting apparatus.

In accordance with one aspect of the present invention, a bale handling and transporting apparatus includes an elongated body such as a trailer for carrying bales loaded thereon. A bale handler carried by the body is movable to at least one first position along a first side of the body and to at least one second position along a second side of the body opposite to the first side, whereby the bale handler may lift bales from either side of the body onto the body. The bale handler body has a longitudinal axis with the first and second sides being positioned on opposite sides of the body. In addition, the bale handler is preferably constructed so as to be movable to plural positions at each side of the body to further facilitate picking up bales and minimize the need to maneuver the body into a precise position before a bale is picked up. The bale handler in one form moves through a path passing over the top of the body when the bale handler is shifted from one side of the body to the other.

The bale handler preferably includes an upright boom pivotally mounted to the body together with a bale gripper mounted to the boom and which is swung to the appropriate side of the trailer for picking up a bale by pivoting the boom. The bale gripper is operable to squeeze the bale to be lifted.

In a more specific implementation of the invention, the upright boom includes an upright first boom section with a lower end portion coupled to the body for pivoting about an upright axis and an upper end portion. The boom also includes a boom arm section extending outwardly from the upper end portion of the first boom section, the boom arm section being raisable and lowerable and extendable and retractable in length to thereby vary the position of the bale gripper as required to position the bale gripper in operable position to grasp and release bales. That is, pivoting the upright boom section about the upright axis shifts the boom arm section to the appropriate side of the body or trailer, with the extension or retraction of the boom arm section shifting the bale handler to position it above a bale. In addition, lowering the boom arm section positions the bale handler in position to receive and squeeze or grip the bale for lifting onto the body.

In accordance with another aspect of the invention, the boom arm section may comprise interconnected first and second arm sections movable relative to one another to lengthen and shorten the boom arm section. For example, the first and second arm sections may be telescopingly interconnected.

As yet another aspect of the present invention, the bale gripper may be coupled to the distal end portion of the boom arm section. The bale gripper may include first and second spaced apart bale squeezing jaws, which may be of any suitable shape with a trapezoidal-shaped jaw being most preferred. At least one of the jaws is movable toward the other jaw to grip a bale therebetween and away from the other jaw to release a bale during the bale handling operation. A telescoping rod assembly may be utilized to shift the jaws relative to one another during grasping and releasing of a bale.

In accordance with another feature of the present invention, a pivot mechanism or assembly is utilized to pivot the first boom section about an upright axis to thereby shift the bale handler as previously described. One preferred form of boom pivot assembly includes a rack coupled to one of the body and the first boom section so as to be movable in a linear direction. In addition, a gear is coupled to the other of the body and the first boom section and in a position to engage the rack. A rack driver is provided to reciprocate the rack linearly and respectively in either direction to thereby drive the gear in either direction and pivot the upright boom section. In the preferred embodiment, the gear is coupled to the first boom section and the rack is coupled to the body.

As yet another aspect of the present invention, the body may comprise a trailer which is articulated and has first and second bed sections. The second bed section is movable in one form of the invention between a first position, in which the second bed section trails the first bed section, and a second position in which the second bed section overlies the first bed section at least in part. As a result, the overall length of the trailer is reduced, for example for travel along a highway.

In one specific form of the invention, the second or trailing bed section is pivotable about an axis which is transverse to a longitudinal axis of the first or forward bed section. The second bed section is pivotable between the first and second bed positions to thereby shift the apparatus from a full length mode to a travel mode. As a more specific feature of the present invention, the first and second bed sections are interconnected by a pivot and pivot actuator, with the pivot actuator being operable to pivot the second bed section about the transverse axis of the first bed section.

The bed sections may each include wheels coupled by axles to the bed sections to facilitate travel of the trailer. In a preferred form of the invention, the wheels of the trailing bed section are offset transversely along their axle relative to the wheels of the first or forward bed section. Therefore, when the bed sections are in their folded or substantially overlying position, the wheels of the second bed section clear the wheels of the first bed section to thereby permit the two bed sections to more fully close together when the trailer is in the travel mode.

The trailer may also include a conveyor belt mounted to the first and second bed sections and operable to convey bales in at least one direction, and most preferably in both directions, respectively, along the length of the trailer body.

The conveyor may comprise a conveyor belt having opposed outer and inner surfaces, the outer surface receiving bales and the conveyor being operable to convey bales along the length of the trailer body. To prevent the belt from shifting transversely relative to the trailer body sections, for example when the belt is loaded with a bale and the trailer is pulled along a hillside, the belt preferably has a key on its inner surface which engages a keyway on the trailer to resist such transverse movement of the belt relative to the longitudinal axis of the first and second bed sections. The bed sections may have belt supports mounted thereon which define the keyway.

As a more specific feature of the present invention, the second or trailing section of the trailer may be coupled to the first section by a pivot actuator which is operable to lower the rear end of the second bed section so as to reduce the clearance between the ground and rear end during unloading of bales. In addition, a tailgate movable between a raised first position and a lowered second position may be shifted between these positions to respectively permit and restrict the passage of bales off the rear end of the trailer.

In one specific form, the invention includes a bale handling and transporting apparatus having an elongated body for carrying the bales and a bale handler that can be positioned to pick up bales located on either side of the body. In one form, the bale handler has a base, an upright boom, an arm, a bale gripper, and a boom actuator. The boom actuator pivots the upright boom, and thereby the arm and the bale gripper, about the axis of the upright boom to either side of the body. The boom actuator may include a rack and activator drive gear for moving the rack and thereby the boom. When the bale handler is in the desired position, the arm can be moved to locate a bale between jaws of the bale gripper. The bale gripper may then be actuated to grasp the bale. The illustrated bale gripper may accomplish the grasping without puncturing any shrinkwrap that may enclose the bale. The boom and arm may then be moved to lift the bale onto the trailer, or any other desired place within reach of the bale handler. The trailer may include a conveyor for shifting bales along the length of the trailer in at least the direction away from the bale handler, and most preferably in either direction. The conveyor typically comprises a belt which is keyed to the trailer bed to prevent sideways shifting of the belt relative to the trailer bed sections.

The body of the bale handling and transporting apparatus may include first and second bed sections. When the bale handling and transporting apparatus is in a position to receive bales, the second bed is located in a first position in which the second bed trails behind the first bed. The second bed may be moved into a second position in which the second bed section overlies the first bed section to thereby reduce the overall length of the body so that transporting the entire bale handling and transporting apparatus is made easier. The rear end of the second bed section may be lowered and a tailgate dropped to facilitate unloading of the bales.

The present invention is directed toward the above objects, advantages and features individually as well as collectively. These and other objects, features and advantages of the present invention will become more apparent with reference to the following description and drawings.

DETAILED DESCRIPTION OF PREFERRED EMBODIMENTS

Figure 1:
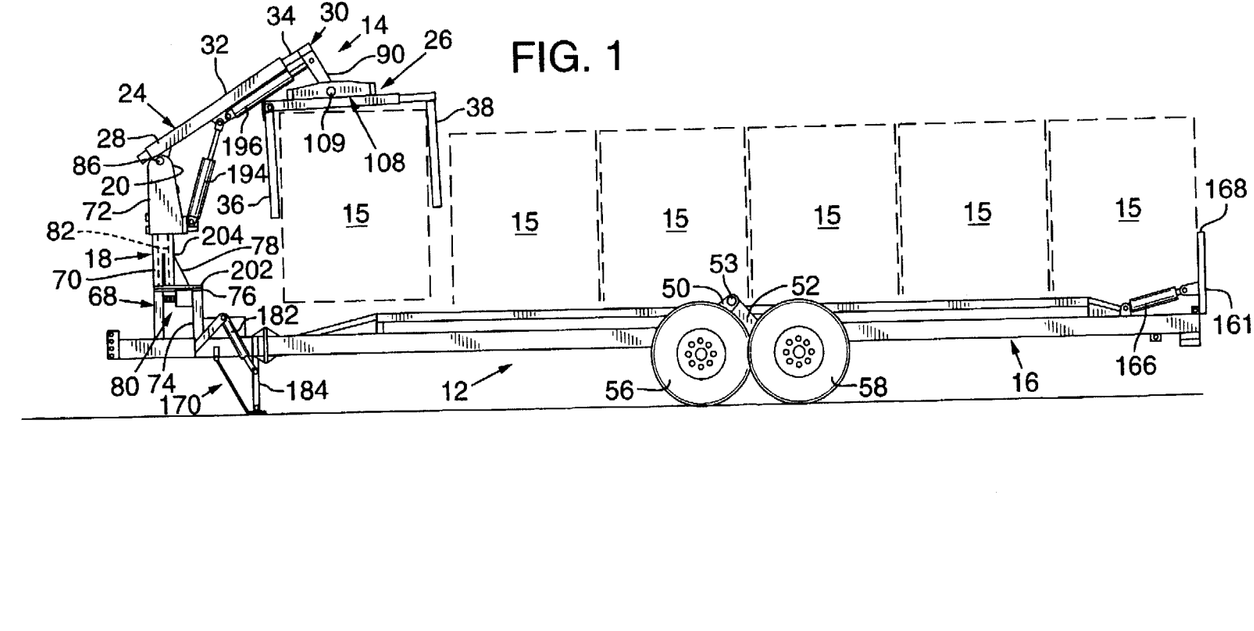
FIG. 1 is a side elevational view of a bale handling and transporting apparatus of the preferred embodiment.
Figure 2:
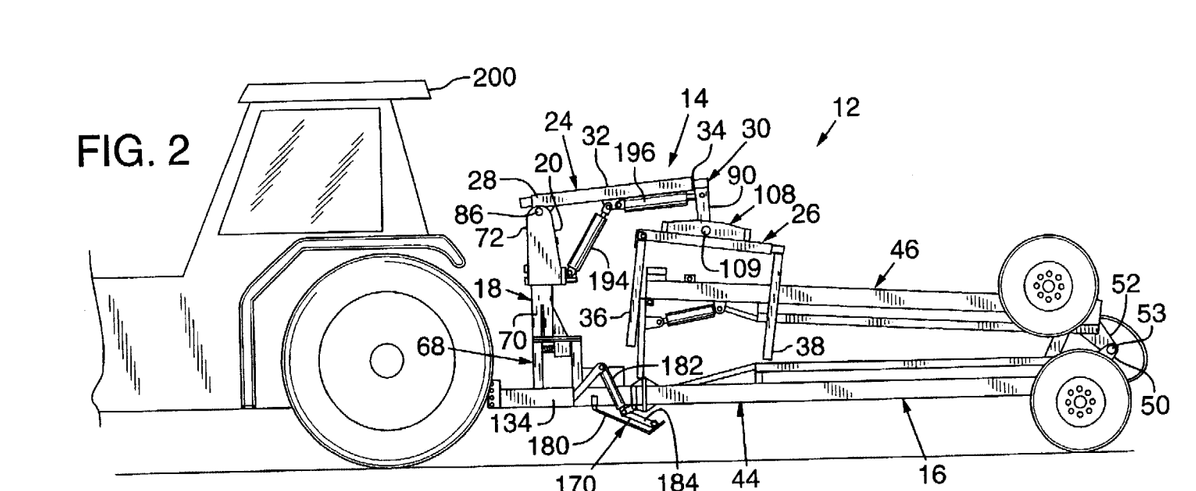
FIG. 2 is a side elevational view of the apparatus of FIG. 1 in a folded or transportation mode whereby the trailer is of reduced length for travel, for example, along a highway.

One form of a bale handling and transporting apparatus in accordance with the present invention is shown in FIG. 1. In this figure, the bale handling and transporting apparatus 12 has an elongated body 16 and a bale handler 14. The elongated body 16 of the illustrated embodiment comprises a trailer which is adapted for hitching to a tractor 200 for towing, as shown in FIG. 2. However, the body 16 may be self-propelled, for example as the bed of a truck, or be moved by other means. The bale handler 14 may be operated to grasp a bale 15 positioned at either side of the body 16, lift the bale onto the body 16, and also unload the bale from the body 16.

Figure 5:
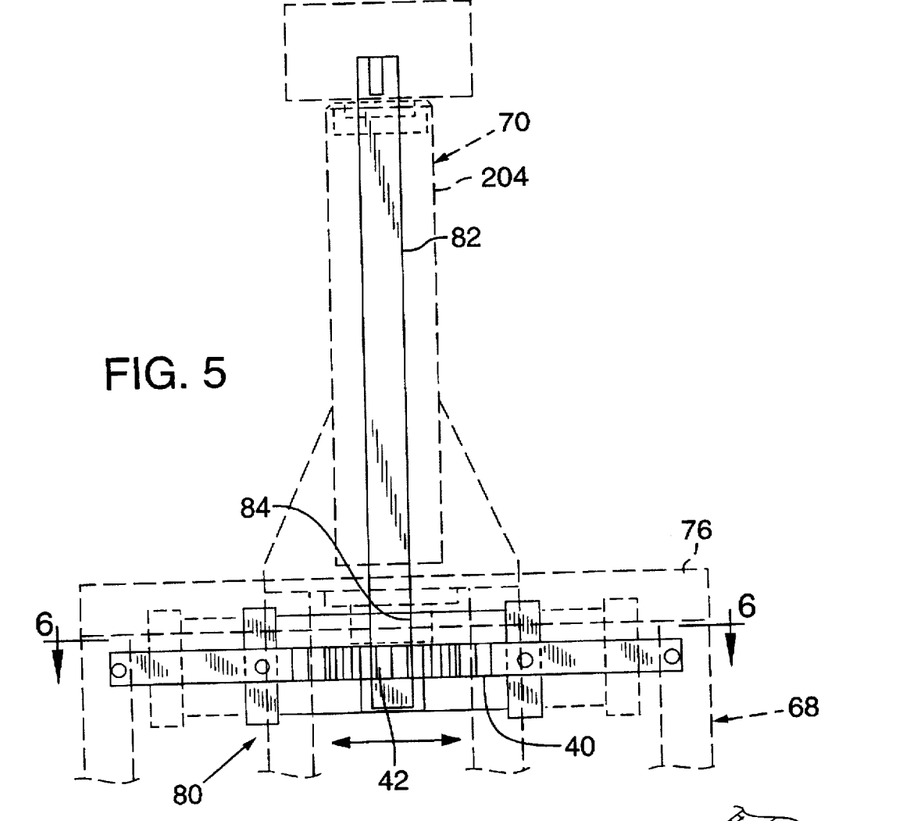
FIG. 5 is a front view of one form of a boom pivot mechanism operable to pivot the boom of the FIG. 1 apparatus and shift the bale handler from side to side of the trailer, certain elements in this figure being shown in dashed lines for convenience.

The illustrated bale handler 14 has a upright boom 18, which in this case is vertical although it can be tilted (e.g. and eliminate the boom arm 24), a boom arm 24, and a bale gripper 26. In the illustrated embodiment, the upright boom 18 has a base 68, a lower upright boom section 70 (FIG. 1), an upper upright boom section 72, and a shaft 82 (the shaft 82 is best seen in FIG. 5). The illustrated base 68 has four legs (one being numbered as 74 in FIG. 1) which support a platform 76. In the preferred embodiment, the legs 74 are welded or otherwise mounted to the elongated body 16. The platform 76 has a shaft receiving hole or opening 84 (see FIG. 5).

Figure 6:
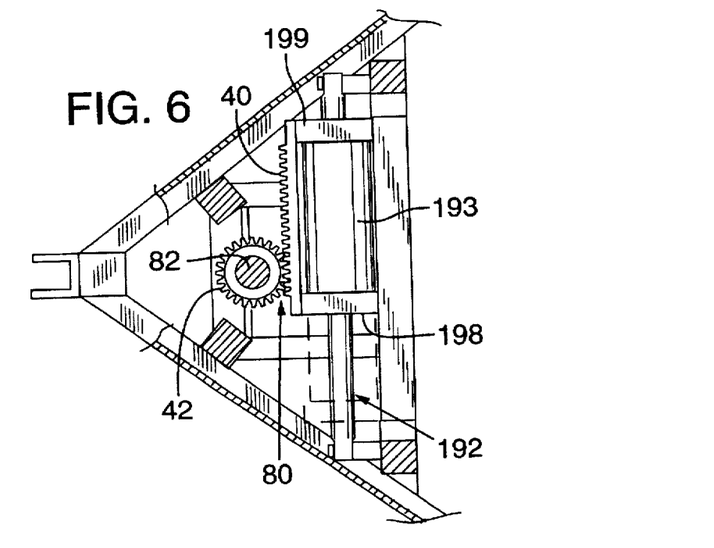
FIG. 6 is a horizontal cross-sectional view of the mechanism of FIG. 5 taken along lines 6—6 of FIG. 5.

The boom 18 is pivoted about its upright longitudinal axis by a boom pivot actuator which may comprise any suitable mechanism. One illustrated form of pivot actuator is shown in FIG. 6. The illustrated boom actuator 80 is operable to pivot the boom 18 and thereby the bale gripper 26 from side to side of the trailer to position the bale gripper for lifting bales onto the trailer. The specific boom actuator 80 operates to pivot the shaft 82, the upper upright boom section 72 and thereby the boom arm 24, and the bale gripper 26.

With reference to FIG. 6, the boom actuator 80 has a rack 40, a gear 42, and rack driver 192. In the preferred embodiment, the rack driver 192 comprises a hydraulic cylinder having cylinder rods and a housing to which a toothed rack is mounted by a pair of brackets 198, 199. The teeth of rack 40 mesh with the gear 42 and the gear 42 is welded, keyed or otherwise fixed to the shaft 82. The cylinder rods have ends which are fixed to the trailer body and one rod has a piston within the cylinder housing. As fluid pressure at one side of the piston is increased, the housing and rack 40 shift linearly in one direction to pivotably drive the gear 42 and shaft 82 in a first direction. Conversely, when the fluid pressure at the opposite side of the piston is increased, the rack and gear are driven in the opposite direction. The rack thus reciprocates to pivot the shaft 82 and connected boom section as desired. The hydraulics of the rack driver 192 are typically connected to controls on the tractor 200, as are the hydraulics of all the actuators mentioned hereafter, however, they may also be self-contained on the trailer. The boom actuator 80 may also have a shield (not shown) to prevent the user from contacting the gear and rack assembly.

The shaft 82 extends from the gear 42 through the hole 84 in the platform 76 and through the upright boom section 70. The shaft 82 extends into and is fixedly attached to the upright boom section 72. Therefore, as shaft 82 pivots, the boom section 72 also pivots to thereby shift the bale gripper 26.

The boom section 70 has a base plate 202 (FIG. 1), a shaft surrounding column 204, and braces 78. The base plate 202 is welded or otherwise mounted to the platform 76 with fasteners, such as screws, bolts, rivets, or the like. The column 204 is upright and is mounted to the base plate 202, for example by welding. The ribs or braces 78 are attached to the column 204 and extend radially therefrom and are also attached to the base plate 202. The braces 78 enhance the structural integrity of the boom 18.

Figures 4, 4A:
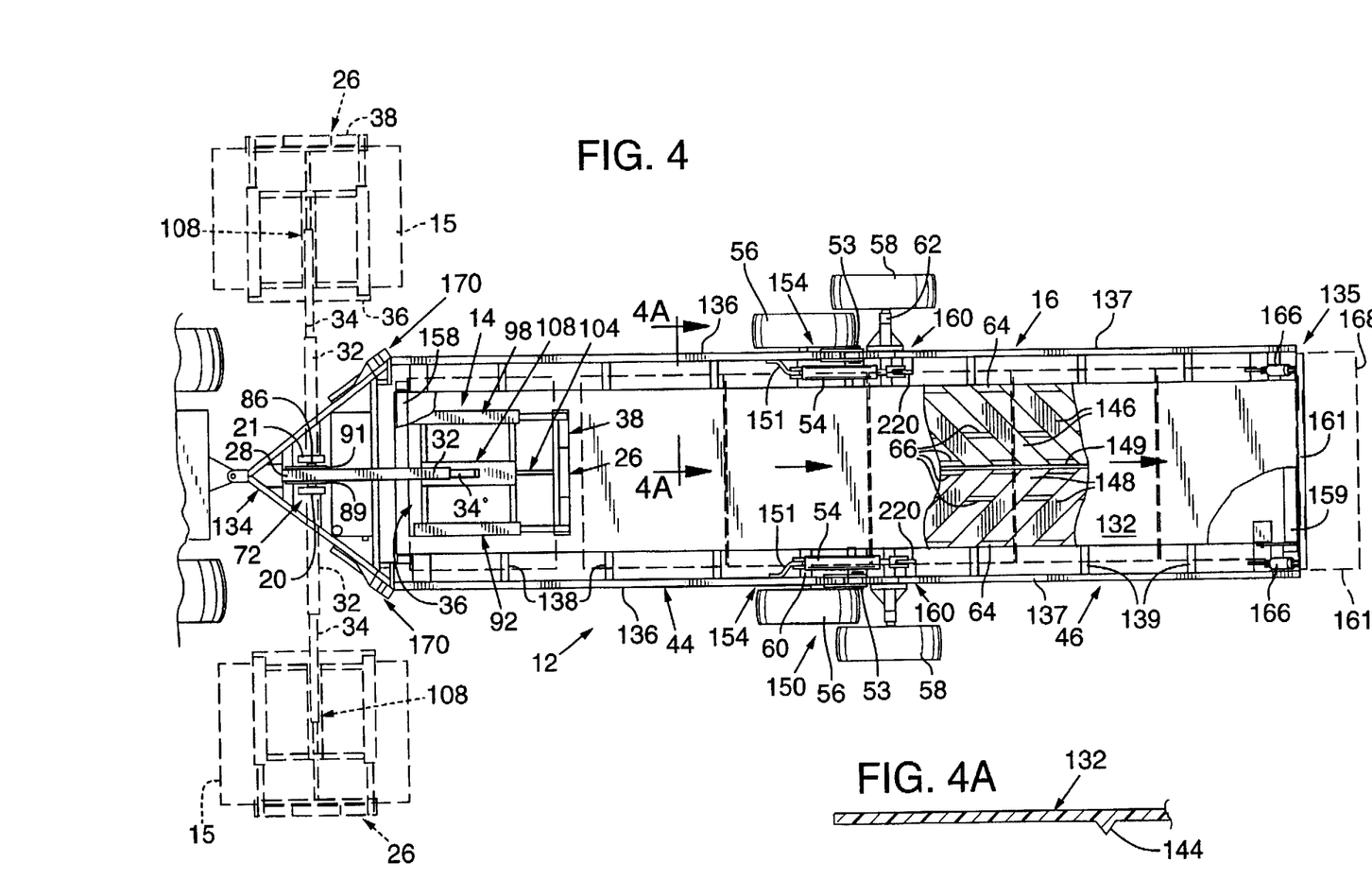
FIG. 4 is a partially broken away top view of the apparatus of FIG. 1.
FIG. 4a is a broken away cross-sectional view of a belt with one form of a key along its undersurface.

The shaft 82 extends through the column 204 and is free to pivot therein. Again, the upper end of the shaft 82 is fixedly attached to the boom section 72. Thus, as the shaft 82 pivots, the boom section 72 follows. The illustrated upper boom section 72 is essentially box-shaped. As best seen in FIG. 4, the upper end of the upper boom section 72 has spaced apart extensions 20, 21, which form an inverted yoke through which a boom arm pivot pin 86 extends.

A first end portion 28 of the boom arm 24 is pivotally attached to the upright boom section 72 by the pin 86. Flanges 89, 91 (FIG. 4) project downwardly from boom arm 24 and define an opening through which pin 86 extends. The illustrated boom arm 24 has a first boom arm section 32 and a second boom arm section 34. The boom arm sections 32, 34 are preferably retractable and extendable relative to one another to vary the length of the boom arm 24. Most preferably the sections are telescopingly interconnected. To this end, the first arm section 32 (FIG. 1) may be a hollow rectangular tube. The second arm section 34 may be a hollow rectangular tube, but with a cross-section which is slightly smaller than that of the interior of the first arm section 32. As a result, the second arm section 34 is slidable within and relative to the first arm section 32.

The boom arm 24 is varied in length by an actuator such as a hydraulic cylinder 196 extending between a mid-portion of the boom arm section 32 and the distal end portion 30 of the boom arm section 34. Extension of cylinder 196 lengthens the boom arm 24 while retraction of the cylinder shortens the boom arm.

In addition to being extendible and retractable, the distal end portion 30 of the boom arm 24 may also preferably be raised and lowered. To accomplish this motion, the boom arm 24 is equipped with an elevation actuator such as a hydraulic cylinder 194. The housing end of cylinder 194 is mounted to a lower portion of boom section 72 while the rod end of cylinder 194 is connected to a mid-portion of boom arm section 32. The boom arm actuator 194 is extended to pivot the boom arm 24 about the pin 86 (counter-clockwise in FIG. 1) and raise the distal end portion 30 of the boom arm 24 and thereby the bale gripper 26. Conversely, the cylinder 194 is retracted to pivot the boom arm 24 about the pin 86 (clockwise in FIG. 1) to lower the distal end portion 30 and thereby the bale gripper.

A bale gripper suspension rod 90 may be provided and extends downwardly from the distal end portion 30 of the boom arm 24. The lower end of the rod 90, supports the bale gripper 26.

The illustrated bale gripper 26 has a frame 108 pivoted by a pin 109 to the lower end of suspension rod 90. First and second spaced apart bale gripping or squeezing jaws 36, 38 project downwardly from the frame. Although the jaws may be both movable relative to one another, most preferably only one of the jaws is movable relative to the other to squeeze a bale therebetween during bale gripping. Although other approaches may be used, as best seen in FIG. 4, jaw 36 is fixed to frame 108 at one side of the frame while jaw 38 is supported by telescoping rods 92, 98 carried by the frame. Any frame with sufficient structural stability to support a lifted bale may, of course, be used. Also, other forms of bale gripping mechanisms may be used in place of mechanism 26.

Figure 7:
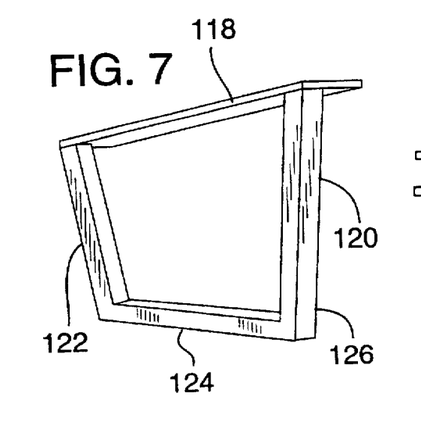
FIG. 7 is a perspective view of one form of a bale gripping jaw usable in the apparatus of FIG. 1.

With reference to FIG. 7, which depicts jaw 36 (with jaw 38 being similar), jaw 36 has an upper brace or flange 118, first and second downwardly projecting legs 120, 122 and a lower cross-piece 124. Jaw elements 120, 122 and 124 are typically of a material which lacks sharp edges, such as of rectangular tubular steel which has been interconnected, as by welding. Therefore, when gripping a shrink-wrapped bale, the risk of tearing the shrinkwrapping is reduced. The jaws 36, 38 are most preferably trapezoidal in shape although other shapes may be used. The cylinder 104 (see FIG. 4) operable to open and close the jaws 36, 38 extends between brace 118 and a corresponding brace of the other jaw.

Although variable depending upon the size of the bales to be handled, jaws 36, 38 typically define a bale receiving opening therebetween which is about three feet wide when the jaws are in their closed or nearest position and about five feet wide when the jaws are open. Also, and although variable, the boom arm typically extends about two feet when fully extended and the boom section 18 is preferably pivotable through at least one-hundred eighty degrees.

Referring to FIG. 4, the illustrated elongated body 16 has a hitch end portion 134, a tail end portion 135, a first bed section 44, a second bed section 46, and an endless conveyor belt 132. The hitch end portion 134 is of an A-frame construction and has a hitch for coupling to a tractor 200 or other vehicle for towing.

The first bed section 44 has a pair of elongated longitudinal parallel spaced-apart side rails 136 interconnected by lateral cross braces, some being numbered as 138. The second bed section 46 also has a pair of elongated parallel spaced apart frame rails 137 interconnected by lateral cross braces, some being numbered 139. Each of the bed sections 44, 46 also have outer longitudinally extending frame rails 64 and a pair of inner longitudinally extending frame rails 66. The outer and inner frame rails 64, 66 are parallel to the side rails 136, 137 and are positioned therebetween. The innermost frame rails 66 are spaced apart (for example about three-fourths inch) and define a belt retaining keyway 149 between them. Frame rails 64, 66 carry a plurality of belt supporting slats or plates 146, 148. The plates 146, 148 are typically made of a friction reducing material, such as three-eighths inch thick ultra high molecular weight (UHMW) polyethylene to facilitate sliding of the belt 132 on the plates. The plates 146, 148 may be arranged in a herringbone pattern as illustrated in FIG. 4. Each plate 146, 148 typically extends inwardly from one of the outer rails and terminates at the edge of the keyway 149 so as to not block the keyway. Of course, the keyway, if used, may be defined in the deck of the trailer or in other ways.

The conveyor belt 132 extends over the belt supporting plates 146, 148 along the length of the first and second bed sections 44, 46. The belt 132 is driven, preferably in either direction, by a motor, such as an orbit hydraulic motor mounted on the forward end of the first bed section 44. The belt 132 most preferably, although not necessarily, can be driven in either longitudinal direction. The motor is drivenly coupled to a front drum 158, for example using linear gear hubs. The drum is typically friction enhanced, such as rubber-coated, and its outer surface is coupled to the inner surface of the belt 132 and drives the belt as the drum rotates. In the illustrated embodiment, the drum is made from four-inch diameter pipe. There is also a rear belt supporting drum 159, such as a six inch in diameter pipe with a friction enhancing material thereon, such as lagging welded thereto. Lagging has a rubber sheathed face with a steel mesh back and is available from Cascade Industrial of Klamath Falls, Oreg. The conveyor belt 132 may be operated to transport bales longitudinally along the length of the body 16 in either direction in the preferred embodiment.

In the preferred embodiment, the conveyor belt 132 is of a plural layered material. The outermost layer is made from PVC facing so that the belt is able to easily slip underneath bales which are held by a tailgate 161 from traveling off the end of the trailer. The middle layer of this specific belt is nylon or other woven fabric, and the belt has an innermost layer with a friction backing, such as of rubber, with sufficient gripping characteristics so that the belt 132 can be moved by driven drum 158 with minimal sliding. This exemplary type of belt 132 is commercially available from Scandura Company of Charlotte, N.C.

The belt 132 also has an optional key 144 (see FIG. 4a). The key protrudes from the under surface of the friction backing of the belt 132 and is typically V-shaped. The key 144 is dimensioned to fit within the keyway 149 (FIG. 4) between the innermost belt supporting frame rails 66. The key 144 restrains the belt against transverse or sideways shifting relative to the longitudinal axis of the trailer. Thus, for example, if the trailer is being pulled along a side hill, the key resists the tendency of bales carried on the belt to shift the belt transversely (laterally) of the bed.

The illustrated first bed section 44 and the second bed section 46 are preferably, but not necessarily, connected together along each side of the trailer assembly by a respective pivot assembly 150. Pivot assemblies 150 allow bed section 46 to fold over bed section 44 (see FIG. 2) when the trailer is empty. Consequently, the apparatus may be shortened for travel along a highway or otherwise during transportation.

Figure 8:
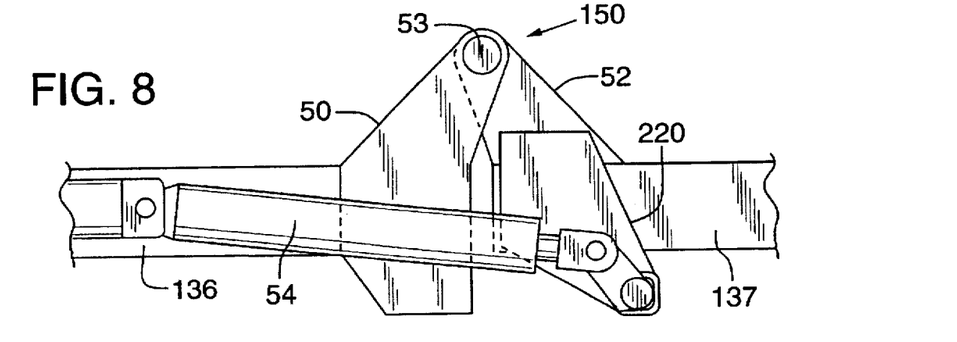
FIG. 8 is a side elevational view of one of a form of bed pivot assembly usable in the apparatus of FIG. 1.
Figure 9:
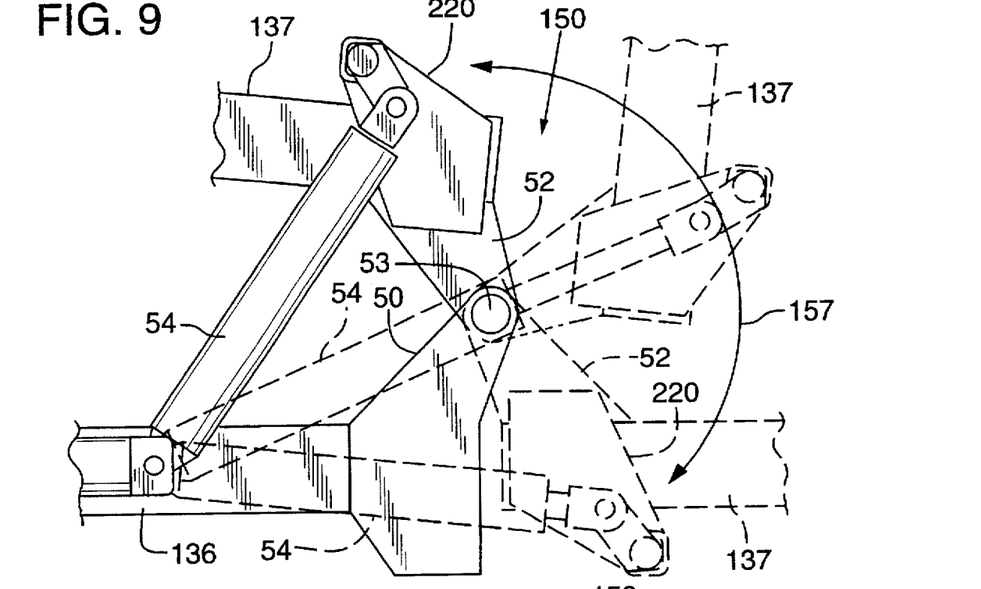
FIG. 9 is a side elevational view of the pivot assembly of FIG. 8 showing the movement of the second bed section from a first trailing position to a second position overlying the first bed section.
Figure 10:
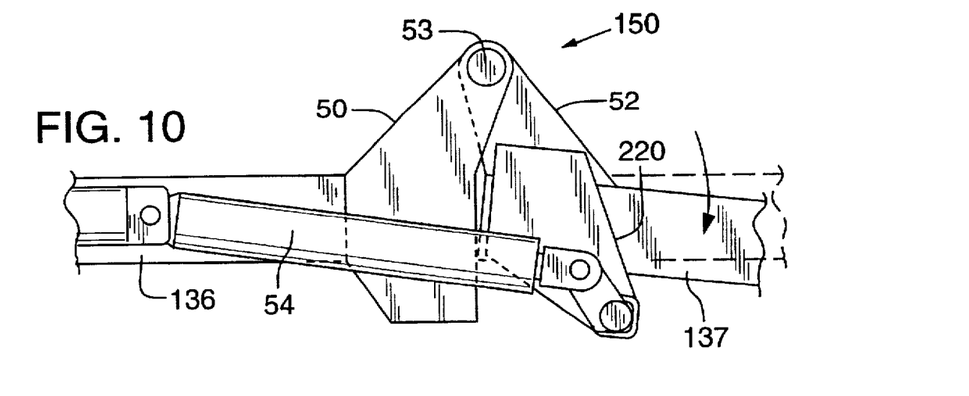
FIG. 10 is a side elevational view of the pivot assembly of FIG. 8 showing the second bed section in a lowered position to facilitate unloading bales.

One form of pivot assembly 150, as best seen in FIGS. 8–10, comprises a first pivot arm bracket 50 coupled to the rear end of a frame rail 136, a second pivot arm bracket 52 mounted to the forward end of a frame rail 137, a pivot pin 53 pivotably interconnecting pivot arms 50, 52, and a pivot actuator such as a hydraulic cylinder 54. The mounting brackets 50, 52, which may take the form of plates, extend upwardly and toward each other from their respective bed sections 44 and 46. The mounting plates are joined at their upward ends by associated pivot pin 53.

Each pivot assembly 150 again has an associated pivot actuator. Each pivot actuator, in the case of hydraulic or other cylinders, is mounted at one end to a respective flange 151 projecting rearwardly from a rear end portion 154 of the first bed section 44 and at the other end to an actuator plate or crank 220 that is mounted to a forward end portion 160 of the second bed section 46. As shown in FIG. 8, when the bed is in its unfolded level position, plate 220 projects downwardly below frame rail 137 and the cylinder 54 is coupled to the plate below the frame rail while pivot 53 is above the frame rails 136, 137.

As each of the pivot cylinders 54 extend, they cause the rear end of the second bed section 46 to rise as the bed section 46 is pivoted about pivot 53 (see arrow 157, FIG. 9, indicating this relative motion of the rear bed section). An intermediate position of the frame rail 137 is shown in FIG. 9 in dashed lines. After the line of action (axis) of the cylinders 54 passes above the pivot 53, the cylinders 54 are retracted to complete the trailer folding process (as shown in solid lines in FIG. 9 and in FIG. 2). The retraction exerts a pulling force on the forward end portion 160 of the second bed section 46, causing the second bed section 46 to pivot further about the pivot pin 53 until the second bed section 46 substantially overlies the first bed section 44. Thus, a two-stroke actuator (extension/retraction) of cylinders 54 is used in this embodiment to fold the trailer sections together. Of course, other forms of actuators and plural cylinder assemblies may be used if desired. The procedure is reversed to move bed section 46 in the direction opposite to arrow 157 (FIG. 9) to unfold the trailer.

Figure 3:
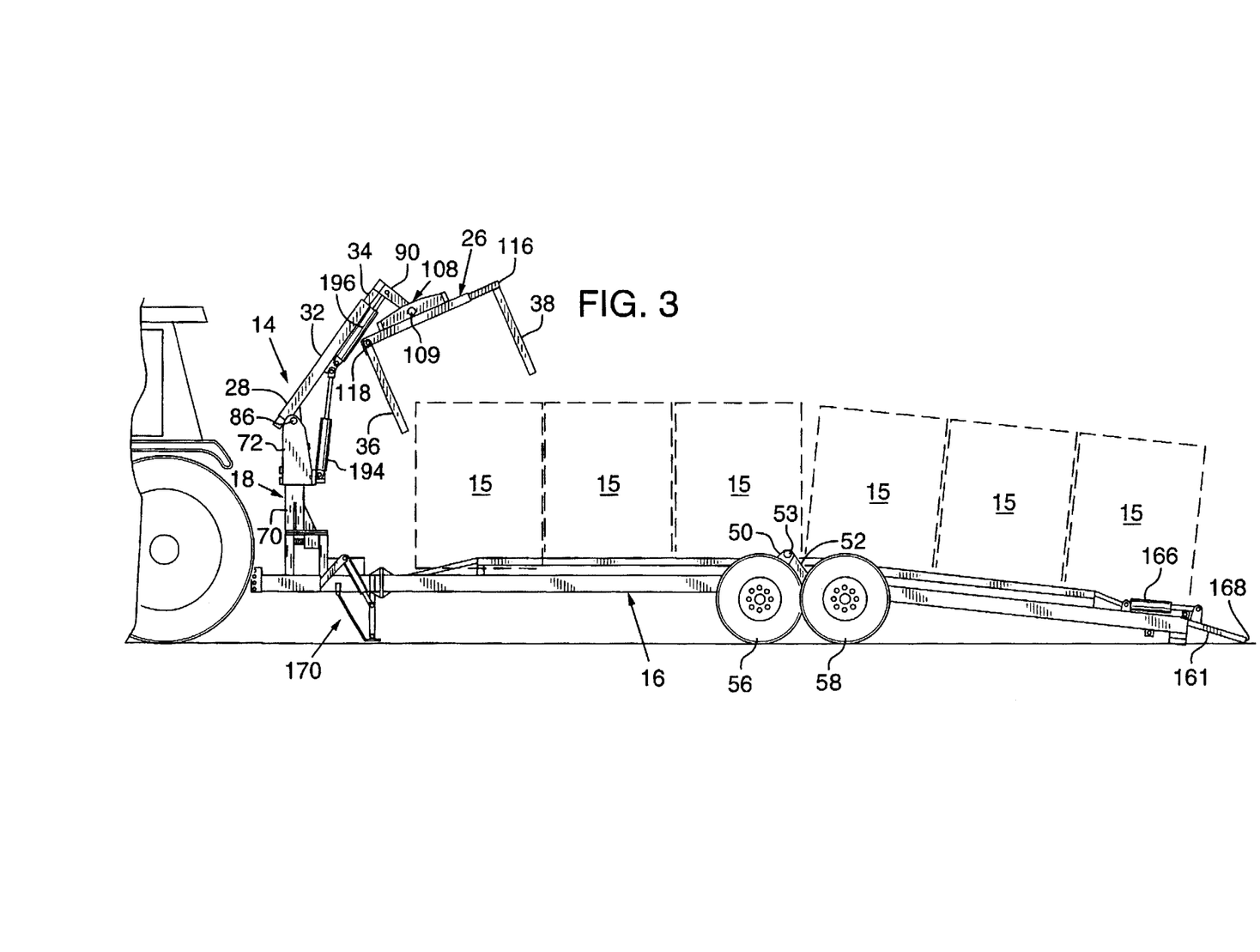
FIG. 3 is a side elevational view of the apparatus of FIG. 1 shown in position to unload bales.

The pivot assembly 150 also is operable to lower the rear end of the second bed section 46, as shown in FIGS. 3 and 10, to reduce the clearance between the ground and the rear end of bed section 46, for example when unloading bales 15 from the trailer.

As shown in FIG. 4, the first bed section 44 has a first transverse axle 60 mounted at the rear end portion 154 of the first bed section 44. A first set of wheels 56 are rotatably mounted to the first transverse axle 60. The second bed section 46 has a second transverse axle 62 mounted to the forward end portion 160 of the second bed section 46. A second set of wheels 58 are rotatably mounted to the second transverse axle 62. In the illustrated embodiment, the second set of wheels 58 are offset further from the side rails 136, 137 than are the first set of wheels 56 and beyond the outer surfaces of wheels 56. Thus, when the second bed section 46 is folded fully to overly the first bed section 44, the first and second sets of wheels 56, 58 clear one another and do not interfere with the folding of the trailer.

In a preferred embodiment, the body 16, or trailer, also has a tail gate 161. The tail gate 161 is pivotably mounted to the rear end of the second bed section 46 and has a pair of tail gate actuators such as hydraulic cylinders 166. When the tail gate actuators 166 are extended, the tail gate 161 pivots from an upright position, through a position aligned with the second bed section 46, and to a lowered position where the distal end 168 of the tail gate 161 touches, or is at least in close proximity to, the ground.

When in the upright position, the tail gate 161 prevents bales at the rear end of the second bed section 46 from falling off the rear end of the trailer or from being conveyed by the conveyor belt 132 off the rear end of the trailer. When the tail gate 161 is in the lowered position, the bales can be conveniently unloaded from the rear end of the trailer by activating the conveyor belt 132 to move the bales rearwardly (to the right in FIG. 3). Thus, the tail gate 161 facilitates unloading of the bales when the tail gate 161 is in the lowered position.

The trailer body 16 is also optionally provided with first and second stabilizers 170 mounted to opposing outer sides of the hitch end portion 134 (one of the stabilizers 170 being visible in FIGS. 1, 2 and 3).

Each stabilizer 170 (FIG. 2) has a stabilizing strut 180 pivoted at an upper end to the trailer frame and a strut actuator for lowering the strut into a trailer supporting position shown in FIG. 1. The strut may be raised and lowered in any manner. In the illustrated form, a hydraulic cylinder 182 is operable to straighten an articulated link 184 to lower the strut and to fold the link 184 to raise the strut. The stabilizers 170 may be lowered to stabilize the trailer body 16 during bale loading and unloading so that the entire weight of the lifted bale and bale handling apparatus is not on the hitch coupling the trailer to the tractor.

In operation, the bale handling and transporting apparatus 12 is moved across a field and positioned along side of a bale with the bale near the forward end of the trailer adjacent to the boom 18 and other bale handling mechanisms. The bale may be located at either longitudinal side of the trailer body 16. The stabilizers 170 are actuated to stabilize the trailer and the bale handler 14 is operated to position the bale gripper 26 above the bale. More specifically, the upright boom 18 is pivoted by boom actuator 80 to shift the boom arm 24 and bale gripper 26 over the bale. In one illustrated exemplary form of boom actuator, rack cylinder driver 192 (FIG. 6) is actuated to move a toothed rack 40 linearly toward the longitudinal side of the body 16 where the bale is located. As the rack 40 moves, the teeth on the rack 40 engage the teeth on a gear 42 and thereby pivot the gear 42.

The pivoting of the gear 42 causes the upright boom 18, the boom arm 24, and the bale gripper 26 to pivot about the upright axis of boom 18 toward a position generally above the bale.

The boom arm extension actuator 196 (FIG. 1) is actuated to extend or retract the boom arm section as required, to place the bale gripper 26 above the bale. The boom arm 24 is typically extended as far as necessary to position the bale gripper 26 above the bale. The bale gripper actuator 104 is also actuated as required to spread jaws 36, 38 far enough apart to receive a bale therebetween. The bale gripper 26 is lowered, by operating actuator 194 to lower the boom 24, to receive the bale. In addition, the jaws 36, 38 are closed to grasp the bale.

When the bale is firmly grasped, actuator 194 is operated to raise the boom arm 24, thereby raising the bale. The boom is then pivoted to position the bale gripper 26 and raised bale above the trailer body 16. The bale is then lowered, by lowering boom 24, and released from the bale gripper 26 by actuating the bale gripper actuator 104 to move the second jaw 38 away from the first jaw 36.

When the bale is positioned on the body 16, the conveyor belt 132 is operated to transfer the bale longitudinally of the body 16 and rearwardly. The bale may be moved partially (e.g. to clear space for the next bale) or entirely toward the end of the trailer at this time. When a bale reaches the rear end of the second bed section 46, the bale abuts the raised tail gate 161. The tail gate 161 prevents the bale from falling off the trailer.

The foregoing steps may be repeated to load additional bales. Also, the steps are not necessarily discrete as simultaneous operation of various actuating fluid cylinders may be accomplished by the operator to more rapidly pick up a bale. As another bale is loaded onto the body 16, the conveyor belt 132 may be again operated to move the newly loaded bale rearwardly along the body 16. As the conveyor belt 132 moves, the belt 132 slips underneath the bales that are already against the tail gate 161.

The bales may be unloaded by reversing the loading steps stated above. Alternatively, the bales may be unloaded from the rear end of the second bed section 46. In the latter method, the second bed section 46 may be lowered to reduce the clearance between the rear end and the ground by activating the pivot actuator 54 (FIG.10) to pivot the bed section 46 about the pivot pin 53 (clockwise in FIGS. 1–3). Also, the tail gate actuator 166 is operated to lower the tail gate 161 such that the distal end 168 is very close to or on the ground.

When the rear end of the second bed section 46 and the tail gate 161 are lowered, the conveyor belt 132 is activated to convey bales off the rear end of the trailer. As the bales are conveyed rearwardly, the tractor 200, and thus the bale handling and transporting apparatus 12, is pulled forward (to the left in FIG. 3) to provide space on the ground for each bale as it is unloaded.

When the bale handling and transporting apparatus 12 needs to be transported when empty, such as along city or state roads, the second bed section 46 is folded over the first bed section 44 to substantially shorten the overall length of the body 16 to make traveling easier, as shown in FIG. 2 (for example, in one form the full length trailer is about thirty feet long and when folded it is about seventeen feet long, thus folded to under about sixty percent of its full length). To fold the second bed section 46, the pivot actuator 150 is operated (FIG. 9) to cause second bed section 46 to pivot about the pivot pin 53 to a folded position (FIG. 2).

This description sets forth various embodiments of the present invention for purposes of illustration only. The description should not be construed to limit the scope of the invention in any way. Numerous other modifications and variations can be made to the invention without departing from the invention as defined by the appended claims and their equivalents.

What is claimed is:

1. A bale handling and transporting apparatus comprising:

an elongated body for carrying bales, the body having a front end and a rear end;

a conveyor belt mounted to the body and operable to convey bales in at least one direction along the length of the body;

a bale handler including an including an upright boom carried by the body at the front end of the body, the boom carry carrying a bale gripper which is movable by the boom to at least one first position along a first side edge of the body so as to engage and lift bales located on the ground along the first side edge of the body, the bale handler also being movable to at least one second position along a second side edge of the body opposite to the first side edge of the body so as to engage and lift bales located on the ground along the second side edge of the body, the bale gripper moving along a path across the top of the body when shifting between first and second positions, whereby lifted bales are movable by the bale handler onto the body and when on the body by the conveyor belt in said at least one direction along the length of the body; and the rear end of the body being movable to a lowered position such that the bales will slide off the conveyor belt onto a ground surface on which the body moves when the conveyor belt is moving in one direction to unload the bales off the rear end of the body and the body is moving in the opposite direction.

2. A bale handling and transporting apparatus according to claim 1 in which the body has a longitudinal axis, the first and second side edges being on opposite sides of the longitudinal axis of the body.

3. A bale handling and transporting apparatus according to claim 1 in which the bale handler is movable to plural first positions and plural second positions.

4. The apparatus of claim 1 in which the upright boom includes an upright first boom section having a lower end portion coupled to the body for pivoting about an upright axis and an upper end portion, the upright boom also including a boom arm section extending outwardly from the upper end portion of the first boom section, the boom arm section being raisable and lowerable and extendable and retraceable in length, and wherein the bale gripper is coupled to the boom arm section and operable to grasp and release bales, whereby pivoting the upright first boom section about the upright axis shifts the boom arm section and thereby the bale gripper to one of the first and second side edges of the body with the extension or retraction of the boom arm section shifting the bale gripper to a position above a bale to be picked up from the ground and whereby lowering the boom arm section positions the bale gripper in position to squeeze and grip the bale on the ground for lifting onto the body.

5. The apparatus of claim 4 in which:

the boom arm section has a distal end portion which is raised and lowered relative to the upper end portion of the first boom section as the first boom section is pivoted;

the boom arm section comprising interconnected first and second arm sections movable relative to one another respectively to lengthen and shorten the boom arm section; and wherein the bale gripper is coupled to the distal end portion of the boom arm section, the bale gripper including first and second spaced apart bale squeezing jaws, at least one jaw being movable toward the other to grip a bale therebetween and away from the other to release a bale, whereby pivoting the upright first boom section swings the boom arm section to one side edge of the body to position the bale gripper above a bale on the ground, the boom arm section then being lowered to position the bale between the bale squeezing jaws, at least one of the bale squeezing jaws thereupon moving toward the other to grip the bale therebetween.

6. The apparatus of claim 5 in which the first and second arm sections are telescopingly interconnected.

7. The apparatus of claim 5 in which the bale gripper includes at least one telescoping rod interconnecting the jaws so as to move at least one jaw toward and away from the other to grasp and release a bale as the telescoping rod is actuated.

8. The apparatus of claim 5 in which the jaws are trapezoid-shaped.

9. A bale handling and transporting apparatus comprising:

an elongated body for carrying bales; and a bale handler carried by the body and movable to at least one first position along a first side of the body so as to engage and lift bales located along the first side of the body, the bale handler also being movable to at least one second position along a second side of the body opposite to the first side of the body so as to engage and lift bales located along the second side of the body, whereby lifted bales are movable by the bale handler onto the body, and in which the body comprises a trailer which is articulated and has first and second bed sections, the second bed section movable from a first position in which the second bed section trails the first bed section and to a second position in which the second bed section overlies the first bed section at least in part to thereby reduce the overall length of the trailer, and the bale handler comprises:

an upright first boom section having a lower end portion pivotally mounted to at least one of the first and second bed sections, the first boom section being pivotable about an upright axis, the first boom section also having an upper end portion;

a boom arm section having a first end portion pivotally attached to the upper end portion of the first boom section, the boom arm section also including a distal end portion spaced from the first end portion which is raised and lowered relative to the upper end portion of the first boom section as the boom arm section is pivoted;

the boom arm section comprising interconnected first and second arm sections movable relative to one another respectively to lengthen and shorten the boom arm section; and a bale gripper coupled to the distal end portion of the boom arm section, the bale gripper including first and second spaced apart bale squeezing jaws, at least one jaw being movable toward the other jaw to grip a bale therebetween and away from the other to release a bale, whereby pivoting the upright first boom section swings the boom arm section to one side of the body to position the bale gripper above a bale, the boom arm section then being lowered to position the bale between the bale squeezing jaws, at least one of the bale squeezing jaws thereupon moving toward the other to grip the bale therebetween.

10. The apparatus of claim 9 further comprising a conveyor belt mounted on the first and second bed sections, the conveyor belt being operable to convey bales in at least one direction along the length of the body.

11. A bale handling and transporting apparatus comprising:

a body having first and second bed sections, the second bed section being movable from a first bed position in which the second bed section trails the first bed section and to a second bed position in which the second bed section substantially overlies the first bed section to thereby reduce the overall length of the body;

a bale handler supported by at least one of the first and second bed sections; and in which the first and second bed sections each have a longitudinal axis, the first bed section has a first transverse axle and a first set of wheels mounted to the first axle, the first axle being positioned at the end of the first bed section adjacent to the second bed section, the second bed section has a second transverse axle and a second set of wheels mounted to the second axle, the second axle being positioned at the end of the second bed section adjacent to the first bed section, and wherein the first and second sets of wheels are offset from one another in a transverse direction such that when the second bed section overlies the first bed section the wheels of the first set are transversely offset from the wheels of the second set.

12. A bale handling and transporting apparatus comprising:

a body having first and second bed sections, the second bed section being movable from a first bed position in which the second bed section trails the first bed section and to a second bed position in which the second bed section substantially overlies the first bed section to thereby reduce the overall length of the body;

a bale handler supported by at least one of the first and second bed sections; and further comprising a conveyor belt mounted on the first and second bed sections, the conveyor belt having opposed outer and inner surfaces, the outer surface receiving bales and the conveyor belt being operable to convey bales in at least one direction along the length of the body.

13. The apparatus of claim 12 in which the second bed section is pivotable about a transverse axis which is transverse to a longitudinal axis of the first bed section to move between the first and second bed positions.

14. The apparatus of claim 13 in which the first bed section and the second bed section are connected by a pivot and a pivot actuator, the pivot actuator being operable to pivot the second bed section about the transverse axis.

15. The apparatus of claim 12 in which the first and second bed sections have a longitudinal axis and the conveyor belt has a key on the inner surface of the belt and the first and second bed sections define a keyway positioned to receive the key, the key and keyway cooperating to resist transverse movement of the belt relative to the longitudinal axis of the first and second bed sections.

16. The apparatus of claim 15 in which the first and second bed sections have longitudinal belt supporting strips mounted thereon which define the keyway.

17. A bale handling and transporting apparatus comprising:

a body having first and second bed sections, the second bed section being movable from a first bed position in which the second bed section trails the first bed section and to a second bed position in which the second bed section substantially overlies the first bed section to thereby reduce the overall length of the body;

a bale handler supported by at least one of the first and second bed sections;

in which the second bed section is pivotable about a transverse axis which is transverse to a longitudinal axis of the first bed section to move between the first and second bed positions;

in which the first bed section and the second bed section are connected by a pivot and a pivot actuator, the pivot actuator being operable to pivot the second bed section about the transverse axis;

in which the second bed section has front and rear ends, the front end being positioned adjacent to the first bed section, and wherein the pivot and pivot actuator are operable to lower the rear end of the second bed section; and further comprising a tail gate mounted to the rear end of the second bed section and movable from a first position in which the tail gate is upright to prevent the bales from falling off the rear end of the second bed section to at least one second position in which the tail gate is lowered to permit unloading the bales off the rear end of the second bed section.

18. A bale transporting trailer having a conveyor belt, the trailer comprising:

a first bed;

a second bed aligned with the first bed;

a pivot connecting the first bed to the second bed; and a pivot actuator operable to pivot the second bed from a first position, in which the second bed trails the first bed, to a second position in which the second bed substantially overlies the first bed.

19. The bale transporting trailer of claim 18 in which the second bed has a front end adjacent to the first bed and a rear end and wherein the pivot and pivot actuator are operable to pivot the second bed to lower the rear end of the second bed such that the bales will slide off the conveyor belt onto a ground surface on which the trailer moves when the conveyor belt is moving in a direction to unload the bales and the trailer is moving in the opposite direction.

20. The apparatus of claim 18 further including a vehicle with a motor and in which the first bed has a forward end articulated to the vehicle.

21. A bale handling and transporting apparatus comprising:

an elongated body including first and second articulated bed sections, the first and second bed sections having longitudinal and transverse axes and front and rear ends, the front end of the second bed section being positioned adjacent to the rear end of the first bed section;

a pivot connecting the first and second bed sections;

a pivot actuator operable to pivot the second bed section about the transverse axis of the first bed section from a first position in which the longitudinal axis of the second bed section is aligned with the longitudinal axis of the first bed section and to a second position in which the second bed section substantially overlies the first bed section, the pivot actuator also being operable to lower the rear end of the second bed section;

an upright first boom section having a lower end portion pivotally mounted to the body for pivoting about an upright axis, the first boom section having an upper end portion;

a boom arm section having a first end portion pivotally attached to the upper end portion of the first boom section, the boom arm section having a distal end portion which is spaced from the first end portion and which is raised and lowered relative to the upper end portion of the first boom section as the boom arm section is pivoted;

the boom arm section comprising telescopingly interconnected first and second arm sections which move relative to one another to lengthen and shorten the boom arm section;

a bale gripper coupled to the distal end portion of the boom arm section, the bale gripper including first and second spaced apart bale squeezing jaws and a telescoping rod interconnecting the jaws such that at least one jaw is movable toward the other jaw to grip a bale therebetween and away from the other jaw to release a bale;

a boom actuator operable to pivot the upright first boom section in respective first and second opposite directions about the upright axis, whereby pivoting the upright first boom section swings the boom arm section and thereby the bale gripper to a side of the body to position the bale gripper above a bale, the boom arm section then being lowered to position the bale between the bale squeezing jaws, at least one of the bale squeezing jaws thereupon moving toward the other to grip the bale therebetween;

a conveyor belt carried by the first and second bed sections, the conveyor belt having an outer bale receiving surface and an inner surface opposed to the outer surface, the conveyor belt having a continuous key on the inner surface of the belt, the first and second bed sections further including belt supporting strips mounted thereon and defining a keyway for receiving the key, the key and keyway cooperating to resist transverse movement of the belt relative to the first and second bed sections;

a first transverse axle mounted to the rear end of the first bed section;

a first set of wheels mounted to the first axle;

a second transverse axle mounted to the front end of the second bed section;

a second set of wheels mounted to the second axle, and wherein the first and second sets of wheels are offset from one another in a transverse direction such that when the second bed section overlies the first bed section the wheels of the first set are transversely offset from the wheels of the second set; and a tail gate mounted to the rear end of the second bed section and movable from a first position in which the tail gate is upright to prevent the bales from falling off the rear end of the second bed section to at least one second position in which the tail gate is lowered to permit unloading the bales off the rear end of the second bed section.

* * * * *